United States Patent [19]

Ito et al.

[11] 4,336,847

[45] Jun. 29, 1982

[54] PERCUSSION DRILL

[75] Inventors: Koshichi Ito; Yoshihiko Watanabe, both of Katsuta, Japan

[73] Assignee: Hitachi Koki Company, Limited, Tokyo, Japan

[21] Appl. No.: 163,504

[22] Filed: Jun. 27, 1980

[51] Int. Cl.³ .............................................. B23B 45/04

[52] U.S. Cl. .................................................... 173/118

[58] Field of Search ................. 173/48, 115, 116, 118; 74/22 R, 22 A

[56] References Cited

U.S. PATENT DOCUMENTS

| | | | |
|---|---|---|---|
| 3,572,448 | 3/1971 | Marcenuk | 173/115 |
| 3,791,461 | 2/1974 | Rosselet | 173/48 |
| 3,828,863 | 8/1974 | Bleicher et al. | 173/118 X |
| 3,835,935 | 9/1974 | Sides et al. | 173/116 X |

FOREIGN PATENT DOCUMENTS

| | | | |
|---|---|---|---|
| 2253173 | 5/1974 | Fed. Rep. of Germany | 173/118 |
| 2364236 | 6/1975 | Fed. Rep. of Germany | 173/116 |
| 2407879 | 8/1975 | Fed. Rep. of Germany | 173/116 |
| 312528 | 7/1969 | Sweden | 173/116 |

*Primary Examiner*—Wm. Carter Reynolds
*Attorney, Agent, or Firm*—Lowe, King, Price & Becker

[57] ABSTRACT

A percussion drill comprises an open-ended, hollow cylinder having an air exhaust hole on the side wall thereof, a piston mounted in the rear end portion of the cylinder, and a slide shaft mounted in the front end portion of the cylinder. A drill bit is releasably attached to the forward end of the slide shaft for working with a material. Between the piston and the slide shaft is mounted a striker which forms a forward variable volume air chamber and a rearward variable volume air chamber. The piston is driven by a motor-crankshaft arrangement to reciprocate axially in the cylinder to cause a positive high pressure to develop in the rearward chamber, which pressure provides an impact on the striker whose mechanical energy is transferred to the slide shaft. A return movement of the piston develops a negative pressure in the rearward chamber to pull back the striker to the impact position. The striker is formed with an air passage which is open at one end to the forward chamber and at the other end to the side wall thereof for communicating the forward chamber to the atmosphere through the air exhaust hole of the cylinder. This communication is established when the workpiece is pierced to allow a negative pressure to develop in the forward chamber.

3 Claims, 8 Drawing Figures

PERCUSSION DRILL

BACKGROUND OF THE INVENTION

The present invention relates to a percussion drill and in particular to an improvement whereby the drill is free from undesirable impact which might occur after the workpiece is pierced.

A conventional percussion drill comprises a hollow cylinder in which a striker is slidably disposed to move forward under positive high pressure developed behind the striker in response to a forward movement of a piston. The striker hits the rear end of a slide shaft disposed in the forward end portion of the cylinder, the striker being bounced rearward and pulled to the original position under a negative pressure developed in response to a rearward movement of the piston. This process is repeated as long as the drill bit attached to the forward end of the shaft is working with a solid material. When the latter is pierced, the working load on the slide shaft is completely removed causing it to extend forward. This causes a compression to occur in the air chamber ahead of the striker and the latter is returned to the rear and again knocked forward in response to the forward movement of the piston in the next stroke. To prevent this knocking, a hole is provided in the cylinder wall to allow the compressed air to escape when the striker approaches the forward end of the cylinder. However, because of this hole, the mechanical energy of the striker is not completely consumed and undesirable impact results. More specifically, the cylinder is provided with an inner sleeve through which the slide shaft axially moves. When the workpiece is pierced, the striker tends to knock the end of the sleeve which would eventually result in breakage of the drill unit. Furthermore, in cases where the drill is held against a ceiling panel or the like, the striker is pulled by gravity and knocked forward again by forward stroke of the piston.

SUMMARY OF THE INVENTION

Accordingly, the primary object of the invention is to provide an improved percussion drill in which, upon piercing of the workpiece, the striker is held in a forward position free from the influence of the forward stroke movement of the piston.

The percussion drill of the invention comprises a hollow cylinder having a vent hole in the side wall thereof, a piston slidably disposed in the rearward end portion of the cylinder and a slide shaft slidably disposed in the forward end portion of the cylinder, and a striker disposed between the piston and the slide shaft. A forward variable volume air chamber is formed between the rear end of the slide shaft and the striker and a rearward variable volume air chamber between the striker and the piston. According to the invention, the striker is provided with an air vent passage which extends from the forward end wall thereof to the side wall thereof. A positive high pressure is developed in the rearward chamber in response to a forward stroke movement of the piston to cause the striker to move forward to the point of impact on the rear end of the shaft to give it a substantial amount of mechanical energy of the striker. A rearward stroke movement of the piston creates a negative pressure in the rearward chamber which pulls the striker rearward. This process is repeated until the material being worked with is pierced. The exhaust holes of the cylinder is located forward with respect to the impact point of the striker on the shaft to allow the forward chamber to open to the atmosphere during the time when drilling work is in progress. This air exhaust hole is closed by the side wall of the striker as it moves forward immediately after the workpiece is pierced. With the exhaust hole being closed, the forward chamber is compressed by the moving striker and a substantial portion of its mechanical energy is absorbed. The remainder of the energy causes the striker to further move forward until the air passage of the striker communicates the exhaust hole to allow the compressed air to escape to the atmosphere. A negative pressure will be developed in the forward chamber when the striker moves rearward as by the pull of gravity when the drill is pointed upward. This rearward movement terminates when the negative pressure is balanced against the gravity exerted on the striker.

BRIEF DESCRIPTION OF THE DRAWINGS

The invention will be further described by way of example with reference to the accompanying drawings, in which:

FIG. 4*c* showing the elements at the instant the material being worked with is pierced; FIG. 4*d* showing the striker moving further forward after the position of FIG. 4*c*; and FIG. 4*e* showing the striker after the position of FIG. 4*d* creating a negative pressure.

DETAILED DESCRIPTION

Figures 1, 2, 3:
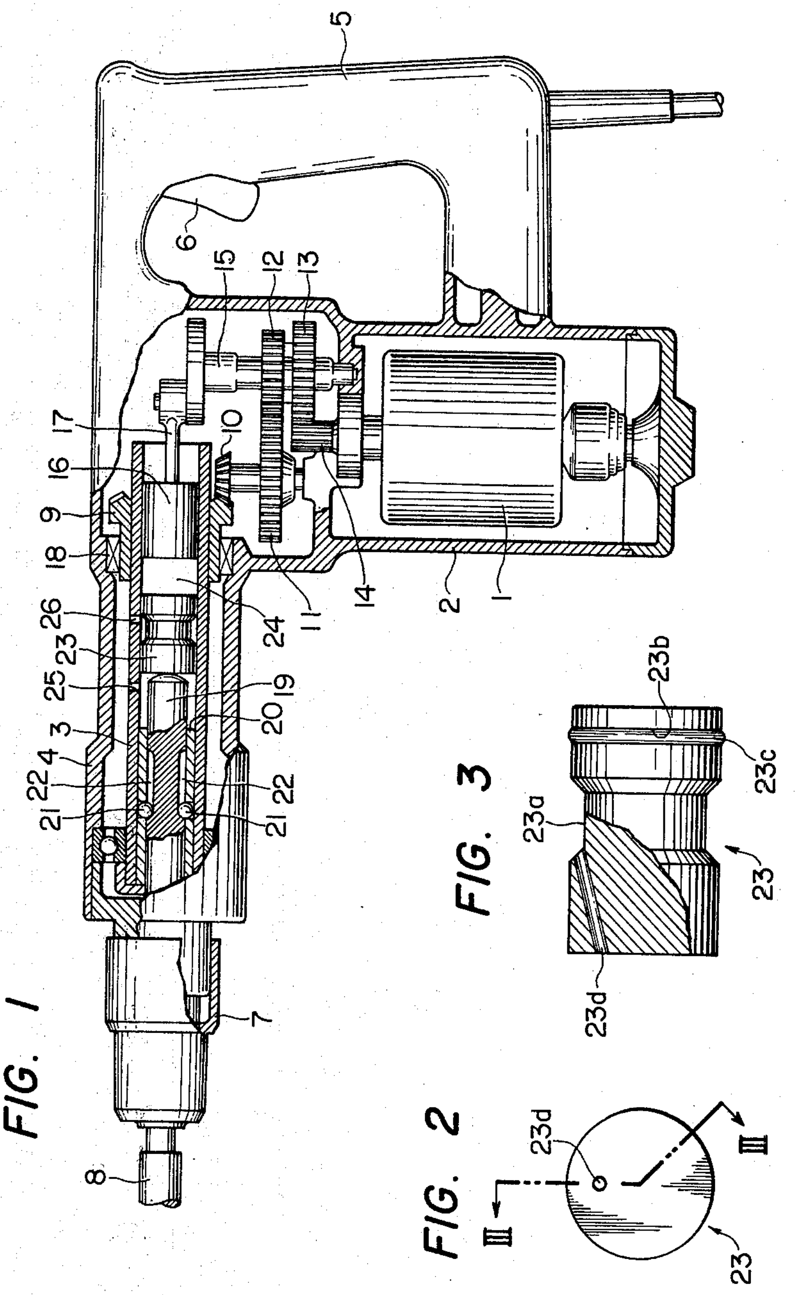
FIG. 1 is a partially broken, side view of the percussion drill of the present invention.
FIG. 2 is an end view of the striker of FIG. 1.
FIG. 3 is a side view of the striker showing a partially broken cross-section taken along the lines 3—3 of FIG. 2.

The percussion drill embodying the present invention as represented in FIG. 1, comprises an electric motor 1 vertically mounted in a casing 2, an open-ended cylinder 3 horizontally mounted within a casing 4, a hand grip portion 5 including a switch 6 for starting the motor, and a bit-holding portion 7 which is threadably mounted on the forward end of the casing 4 for detachably holding a tool bit 8. To the rearward end of the cylinder 3 is secured a bevel gear 9 journalled through a needle roller bearing 18, the bevel gear 9 being in mesh with a gear 10 which is operatively coupled to the toothed rotary shaft 14 of the motor 1 through a gear train including spur gears 11,12 and 13. The spur gears 12 and 13 are keyed to a crankshaft 15 to which is operatively connected a piston 16 by means of a connecting rod 17. The piston 16 is located on the rear end portion of the cylinder 3 to create a positive high pneumatic pressure in the cylinder 3 as it reciprocates axially by the rotation of the crankshaft 15, while the cylinder 3 is given a rotary motion by the bevel gears 9 and 10.

Within the cylinder 3 is a slide shaft 19 which is rotatably and axially fitted into a sleeve 20 fixedly secured to the inner wall of the cylinder 3, and is releasably connected at its forward end with the tool bit 8 by means of the holding portion 7. The rotary motion of the cylinder 3 is transmitted to the slide shaft 19 by means of balls 21 which are partially engaged in holes provided in the sleeve 20 and partially engaged with axially extending grooves 22 of the slide shaft 19. The grooves 22 also serve to define the limits of travel for the reciprocating motion of the slide shaft 19. Between the slide shaft 19 and the piston 16 is located a striker 23 which is air-tightly sealed against the inner wall of the cylinder 3 to hit the rear end of the shaft 19 under the influence of the positive high pressure created in a chamber 24 as the piston 16 is moved to the forward position. The cylinder 3 is further provided with air vent passages or holes 25 and 26 whose functions will be described later.

As illustrated in FIGS. 2 and 3, the striker 23 is generally in the shape of a cylinder having a small diameter portion 23*a* and an annular groove 23*b* in which a ring 23*c* is engaged to provide air-tight engagement with the inner wall of the cylinder 3. A throughbore 23*d* is formed to provide an air passage between the forward end of the striker and the smaller diameter portion 23*a*.

Figure 4A:
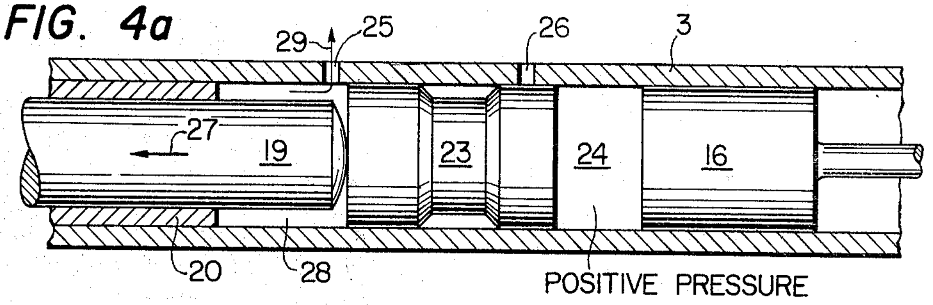
FIGS. 4*a*–4*e* are illustrations of the operational detail of the percussion drill of the invention; specifically, FIG. 4*a* showing the striker being at the point of impact on the shaft during a forward stroke movement of the piston, FIG. 4*b* showing the striker moving rearward during a rearward stroke movement of the piston.
Figure 4B:
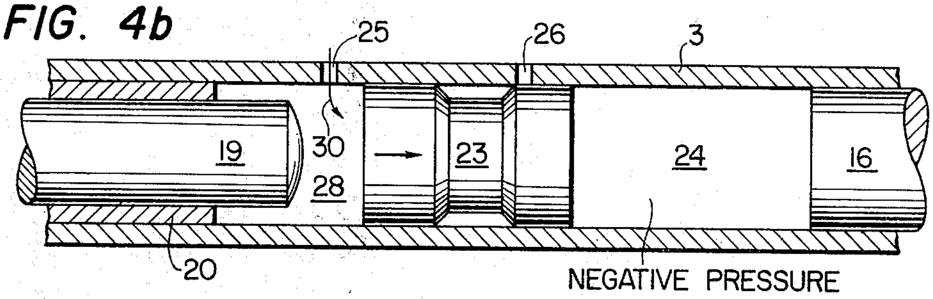

The operation of the percussion drill of the invention will be visualized with reference to FIGS. 4*a* to 4*e*. When the piston 16 is moved to the forward position (FIG. 4*a*), a positive high pressure is created in the chamber 24 and the striker 23 is forced forward and hits the rear end of the slide shaft 19, whereby a substantial part of the mechanical energy of the striker 23 is transmitted to the shaft 19, causing it to move in the direction as indicated at 27. Upon impact the striker 23 is bounced from the rear end of the moving shaft 19 causing a rearward movement which is assisted by a negative pressure created in the chamber 24 when the piston 16 moves to the rear position (FIG. 4*b*). This process will be repeated until the tool bit 8 has pierced through the workpiece such as a concrete panel. During this process the slide shaft 19 remains extended from the end of the sleeve 20 and the air inside a chamber 28 is expelled through the passage 25 as indicated at 29 when the striker 23 is moving forward (FIG. 4*a*). The passage 25 then serves to admit air into the chamber 28 as indicated at 30 when the striker 23 is moving rearward (FIG. 4*b*).

Figure 4C:
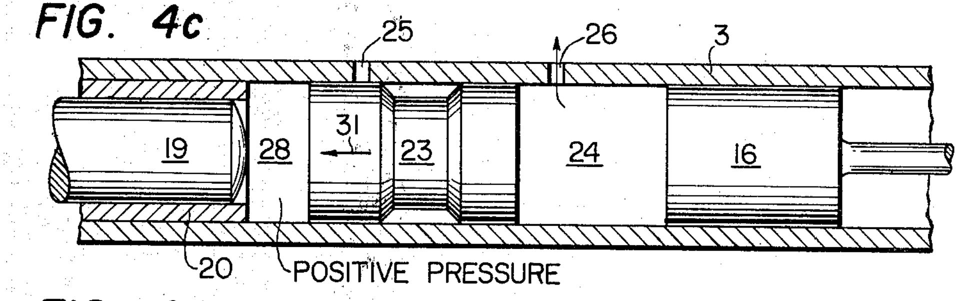
Figure 4D:
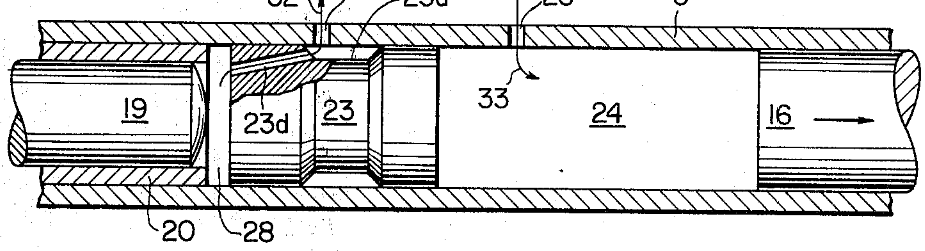

When the workpiece is pierced and so the slide shaft 19 moves further forward from the position of FIG. 4*b*, its rear end becomes even with the end of the sleeve 20 as illustrated in FIG. 4*c* and the striker 23 continues to move after impact by its inertia as indicated at 31 and moves past the passage 26 allowing the pressurized air in the chamber 24 to exit through passage 26 to the atmosphere. As a result of this further movement, the striker 23 comes to a position which closes the passage 25 to create a positive high pressure in the chamber 28. As the striker 23 approaches the end of the sleeve 20, the chamber 28 opens to the atmosphere through a passage 32 formed by the groove 23*d*, the annular recess formed around the periphery of the small diameter portion 23*a* and the passage 25, as illustrated in FIG. 4*d*, so that the inside of the chamber 28 is gradually reduced to the atmospheric pressure. As the piston 16 is returning to the rear position, the striker 23 will come into engagement with the end of the sleeve 20 with no substantial impact or come to a standstill in a position spaced a distance rearward from the end of the sleeve 20, since the air inside the chamber 28 serves as a shock absorber.

It will be noted that the effect of the passage 26 serves the purpose of preventing a pressure depression in the chamber 24 as the piston 16 is moving rearward. The negative pressure, if excessive, would act on the striker 23 as a rearward pulling force and cause it to return before it reaches the position of FIG. 4*d*, and as a result the striker 23 is again hit by the piston during the next forward stroke, which is undesirable in the absence of loading.

Figure 4E:
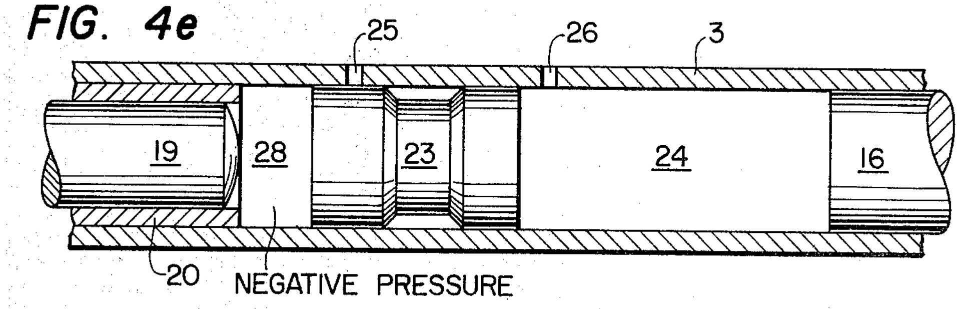

The striker 23 will remain in a position near the end of the sleeve 20 if the drill unit has been held with its tool bit pointed in the horizontal direction, which position is a safe distance from the forward end of the piston 16. If the drill unit has been held in a position in which its tool bit is pointed upward, the striker 23 will move rearward due to the pull of gravity closing the passage 25 to create a negative pressure in the chamber 28 as illustrated in FIG. 4*e*, so that its further rearward movement is limited when the gravitational pull is balanced against the negative pressure.

The striker 23 can be returned to the normal working position by manually pushing the drill bit 8 rearward against the force of the negative pressure in the chamber 28.

What is claimed is:

1. A percussion drill comprising:
   - a hollow cylinder having a hole in the side wall thereof;
   - a piston axially slidably disposed in the rearward end portion of said cylinder;
   - means for imparting an axially reciprocating movement to said piston;
   - a shaft axially slidably disposed in the forward end portion of said cylinder and including means for releasably attaching a drill bit to the forward end of the shaft; and
   - a striker including an air passage leading from the forward end wall thereof to the side wall thereof and axially slidably disposed in the cylinder between said piston and said shaft to define a forward variable volume air chamber with said shaft and a rearward variable volume air chamber with said piston, a forward movement of said piston creating a positive high pressure in said rearward chamber to cause the striker to move forward to a point of impact on the rear end of said shaft and a rearward movement of said piston creating a negative pressure in said rearward chamber to cause the striker to move rearward when said drill bit is imparting mechanical energy to a workpiece;
   - the hole of said cylinder being located forward with respect to said impact point and communicating with said forward chamber through said air passage of the striker when the forward end of the striker is positioned forward with respect to said hole by the axial extent of said air passage.

2. A percussion drill as claimed in claim 1, further comprising means for rotating said cylinder about its longitudinal axis and means for coupling said cylinder to said slidable shaft to permit said shaft to rotate with said cylinder while permitting said shaft to axially move with respect to said cylinder, and wherein said striker comprises a cylindrical solid body having an annularly recessed portion intermediate the ends of said cylindrical body and said air passage being open at one end to said forward chamber and at the other end to said annularly recessed portion.

3. A percussion drill as claimed in claim 1 or 2, wherein said cylinder further includes a second hole in the side wall thereof located in such a position that the rearward chamber is open to the atmosphere when said striker is positioned forward with respect to said impact point.

* * * * *